United States Patent [19]

Hsu

[11] Patent Number: 5,471,529
[45] Date of Patent: Nov. 28, 1995

[54] UNIVERSALLY-LINKED REINFORCING HANDSET MEANS FOR PAY PHONE

[76] Inventor: Run-Chi Hsu, c/o Hung Hsing Patent Service Center P.O. Box 55-1670, Taipei, Taiwan

[21] Appl. No.: 264,518

[22] Filed: Jun. 23, 1994

[30] Foreign Application Priority Data

Dec. 30, 1993 [CN] China ................... 93121191.3

[51] Int. Cl.$^6$ .................................................. H04M 1/00
[52] U.S. Cl. ..................... 379/438; 379/451; 379/437; 379/453
[58] Field of Search ................................. 379/437, 438, 379/451, 453; 312/223.4; 52/27, 27.5

[56] References Cited

U.S. PATENT DOCUMENTS

4,518,830  5/1985  Drexler et al. ..................... 379/438

Primary Examiner—Jeffery A. Hofsass
Assistant Examiner—Jack Chiang

[57] ABSTRACT

A handset of a pay phone includes a reinforcing coupler firmly secured to the handset for coupling the handset with an armored cord linked to the pay phone, having a locking head of the reinforcing coupler stably secured to a mouthpiece of the handset for firmly fastening a flexible hose of the armored cord and a transmitter bracket stably mounted in the mouthpiece of the handset for holding a transmitter in the bracket with a retarding member protruding downwardlly from the transmitter bracket to retain the locking head of the reinforcing coupler to resist an inwardly pushing of the armored cord, thereby preventing an easy breaking of a plurality of communication wires of the armored cord. The pay phone is also provided with a universal adapter for universally connecting the armored cord of the handset to a housing or wall plate of the pay phone for universally orienting the armored cord of the handset for ergonomically holding the handset by a phone user and also for minimizing stress acting upon the adapter of the armored cord for preventing breaking of the cord.

6 Claims, 6 Drawing Sheets

UNIVERSALLY-LINKED REINFORCING HANDSET MEANS FOR PAY PHONE

BACKGROUND OF THE INVENTION

A conventional pay phone includes a handset remotely secured to the pay phone by a flexible armored cord. Since a conventional armored cord is directly fixed to the casing of the pay phone without through any universal joint or adapter, a frequent twisting, pulling or swinging on the armored cord by a phone user may easily damage or break a connection between the armored cord of the handset and the pay phone. Meanwhile, after the pay phone is served for the public for a long time, frequent accidental and forcible pulling of the handset may easily break the communication wires especially at the connecting point between the armored cord and the handset.

SUMMARY OF THE INVENTION

The object of the present invention is to provide a handset of a pay phone including a reinforcing coupler firmly secured to the handset for coupling the handset with an armored cord linked to the pay phone, having a locking head of the reinforcing coupler stably secured to a mouthpiece of the handset for firmly fastening a flexible hose of the armored cord and a transmitter bracket stably mounted in the mouthpiece of the handset for holding a transmitter in the bracket with a retarding member protruding downwardlly from the transmitter bracket to retain the locking head of the reinforcing coupler to resist an inwardly pushing of the armored cord, thereby preventing an easy breaking of a plurality of communication wires of the armored cord.

Another object of the present invention is to provide a universal adapter for universally connecting the armored cord of the handset to a housing or wall plate of a pay phone for universally orienting the armored cord of the handset for ergonomically holding the handset by a phone user and also for minimizing stress acting upon the adapter of the armored cord for preventing breaking of the cord.

DETAILED DESCRIPTION

As shown in the drawing figures, the present invention comprises: a handset 1 including a microphone portion 11 with a transmitter 14 formed therein and an earpiece portion 17 with a receiver 171 formed therein, an armored cord 2 remotely securing the handset 1 to a pay phone 5, a reinforcing coupler 3 secured to the microphone portion 11 of the handset 1 for fixing a first end portion of the armored cord 2 in the reinforcing coupler 3 and having a retarding member 36 retained on a transmitter bracket 15, which holds the transmitter 14 therein, for retarding an inwardly protruding of the armored cord 2 into the handset for firmly securing the armored cord 2 with the handset 1, and a universal adapter 4 universally mounted on the pay phone 5 and having a second end portion of the armored cord 2 secured in the universal adapter 4 for universally linking the armored cord 2 to the pay phone 5 for ergonomically holding the handset 1 when using the pay phone 5.

The pay phone 5 may be any conventional public telephones. The designs, shapes, materials, and constructions of the handset, the cord 2, the adapter 4 and the pay phone 5 are not limited in this invention, which may be suitably modified by those skilled in the art.

Other modification can be made, such as the universal mechanism, the locking of the reinforcing coupler 3 on the microphone portion 11 of the handset 1, without departing from the spirit and scope of this invention.

The handset 1 includes: a microphone portion 11 formed on a lower portion of the handset 1, a transmitter 14 held in a transmitter bracket 15 having a retaining flange 151 circumferentially formed on a circumference of the transmitter bracket 15 with the retaining flange 151 fixed on a transmitter seat 13 which is engaged with a microphone cover 12 for shielding the seat 13 and the transmitter 14 within the microphone portion 11, a collar 16 defining a central opening 161 in the collar 16 integral to a lower portion of the microphone portion 11 for securing the retaining coupler 3 on the collar 16, an earpiece portion 17 formed on an upper portion of the handset 1 opposite to the microphone portion 11 with a receiver 171 held in the earpiece portion 17, and a weight core 18 embedded in an upper portion of the handset 1 adjacent to the earpiece portion 17.

The armored cord 2 includes: a communication cord 21 having a transmitting wire loop 211 electrically connected to the transmitter 14 in the handset 1, a receiving wire loop 212 electrically connected to the receiver 171 in the handset 1, both transmitting wire loop 211 and receiving wire loop 212 being insulated by an insulator 210 and having a connector 24 connecting an inner end of the communication cord 21 to a telephone communication system in the pay phone 5; a flexible hose 22 surrounding the communication cord 21 having a handset end 221 secured in the reinforcing coupler 3 in the microphone portion 11 and an adapter end 222 secured in the universal adapter 4 for remotely securing the handset 1 to the pay phone 5; and a reinforcing steel wire 23 securing the handset 1 to the universal adapter 4 universally mounted on the pay phone 5 with a handset-side end 231 secured to the weight core 18 in the handset 1 and with an adapter-side end 232 fixed in the universal adapter 4.

Figure 1:
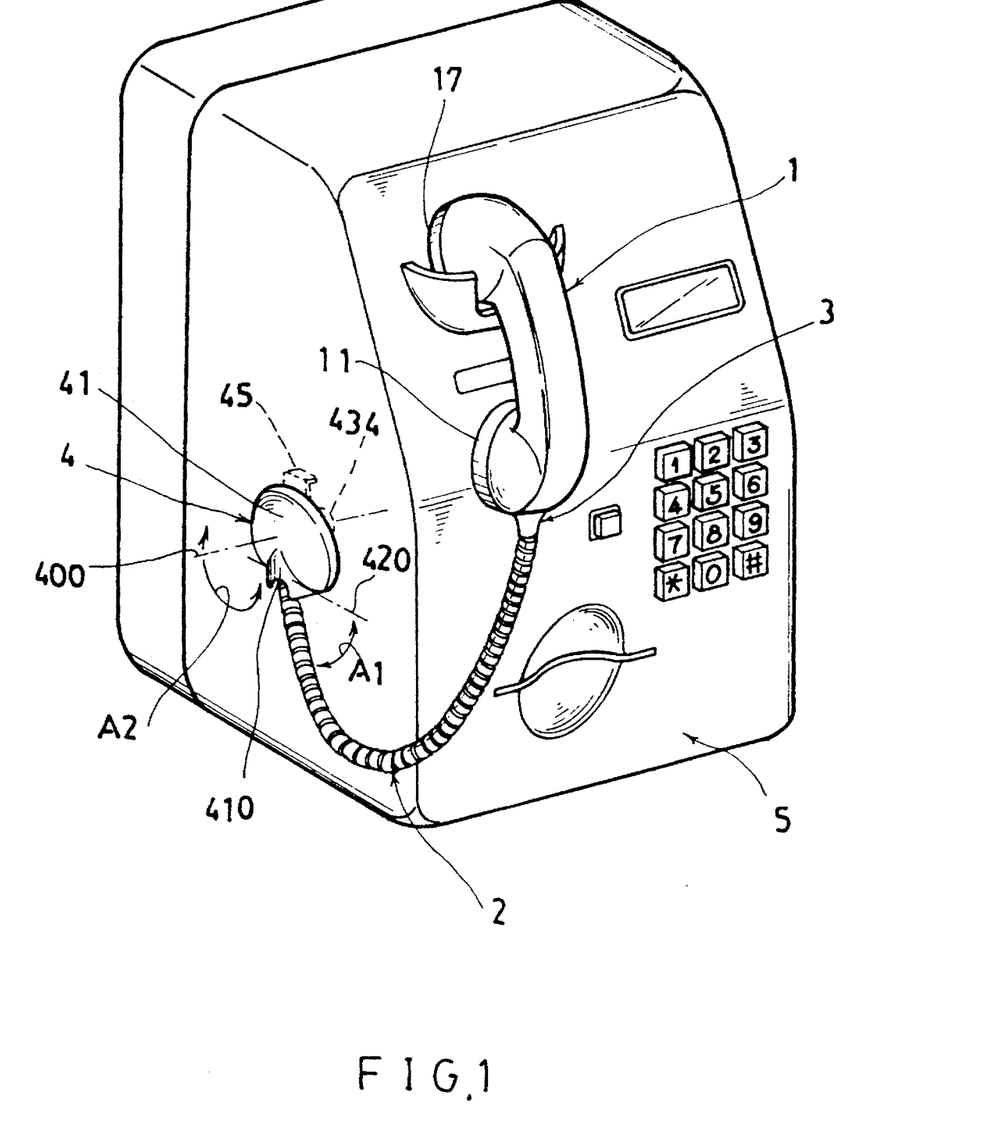
FIG. 1 is a perspective view of the present invention.
Figure 2:
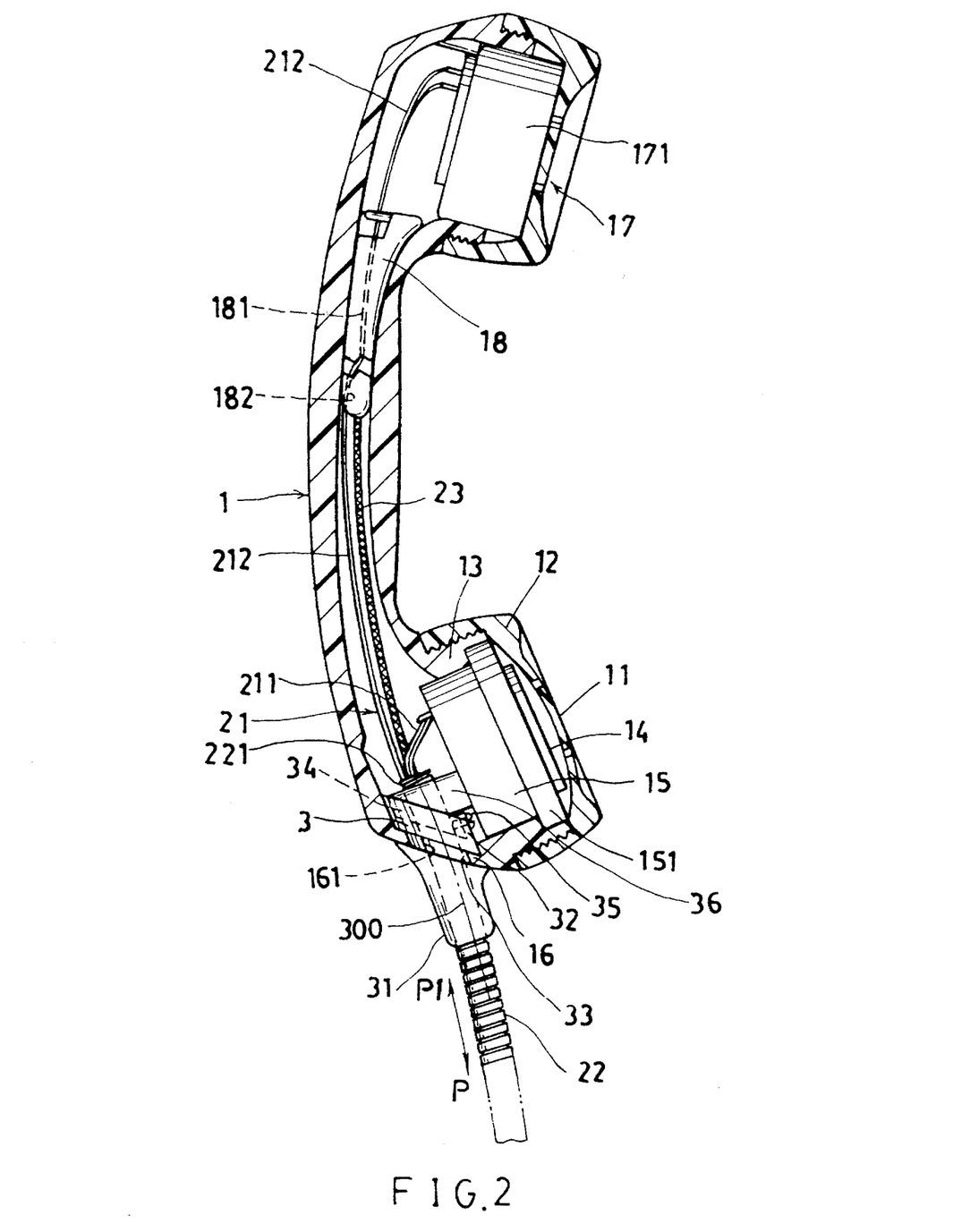
FIG. 2 is a partial sectional drawing of a handset in accordance with the present invention.

The reinforcing coupler 3 includes: a locking head 32 having a packing member 34 embedded in the locking head 32 for fixing a fixing screw 35 through the locking head 32 and the packing member 34 towards the handset end 221 of the flexible hose 22 of the armored cord 2 passing through a through hole 30 formed in the coupler 3 for fastening the armored cord 2 with the handset 1, a sleeve portion 31 protruding outwardly from the locking head 32 to dispose around the flexible hose 22, both sleeve portion 31 and locking head 32 being made of elastomer materials such as rubber or the like, a neck portion 33 concentrically recessed in between the locking head 32 and the sleeve portion 31 for engaging the collar 16 of the handset 1 for firmly locking the reinforcing coupler 3 with the handset 1, and a retarding member 36 integrally secured to the transmitter bracket 15 for retaining the locking head 32 of the reinforcing coupler 3 for resisting an inwardly protruding of the reinforcing coupler 3 and the armored cord 2 fixed therein as backed by the transmitter bracket 15 which is retained in between the transmitter seat 13 and the microphone cover 12 as shown in FIG. 2 for firmly securing the reinforcing coupler 3 and the armored cord 2 with the handset 1.

Since an inwardly protruding of the cord 2 is retarded by the retarding member 36 and the neck portion 33 of the locking head 32 is also locked on the collar 16, the cord 2 will not be inwardly protruded; while an outwardly pulling of the cord 2 from the handset 1, the recessed neck portion 33 of the reinforcing coupler 3 is engaged on the collar 16 to thereby prevent an outward pulling of the cord 2 from the handset 1. Therefore, the handset 1 will be firmly secured with the armored cord 2 and will prevent a breaking or damage of the communicating cord 21 in the armored cord 2 for safety and security purpose.

Figure 4:
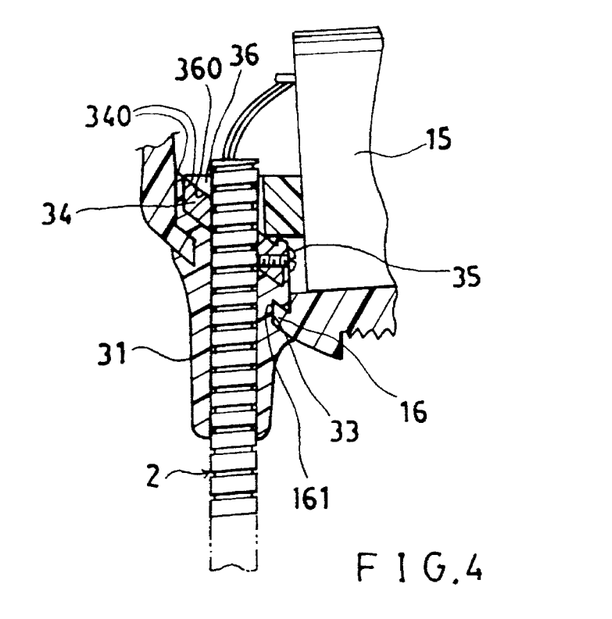
FIG. 4 is a partial enlarged illustration of a reinforcing coupler in accordance with the present invention.

The locking head 32 and the packing member 34 embedded the locking head 32 define a lower inclined surface 340 on an inner surface of the locking head 32 and the packing member 34 with the lower inclined surface 340 deviating from a longitudinal axis 300 longitudinally existing at a center of the reinforcing coupler 3 with an acute angle as shown in FIGS. 2 and 4; and the retarding member 36 is formed with an upper inclined surface 360 on a bottom surface of the retarding member 36 for tangentially engaging the lower inclined surface 340 of the reinforcing coupler 3 for blocking the locking head 32 and the packing member 34 as backed by the transmitter bracket 15 retained in the microphone portion 11 of the handset 1.

Figure 3:
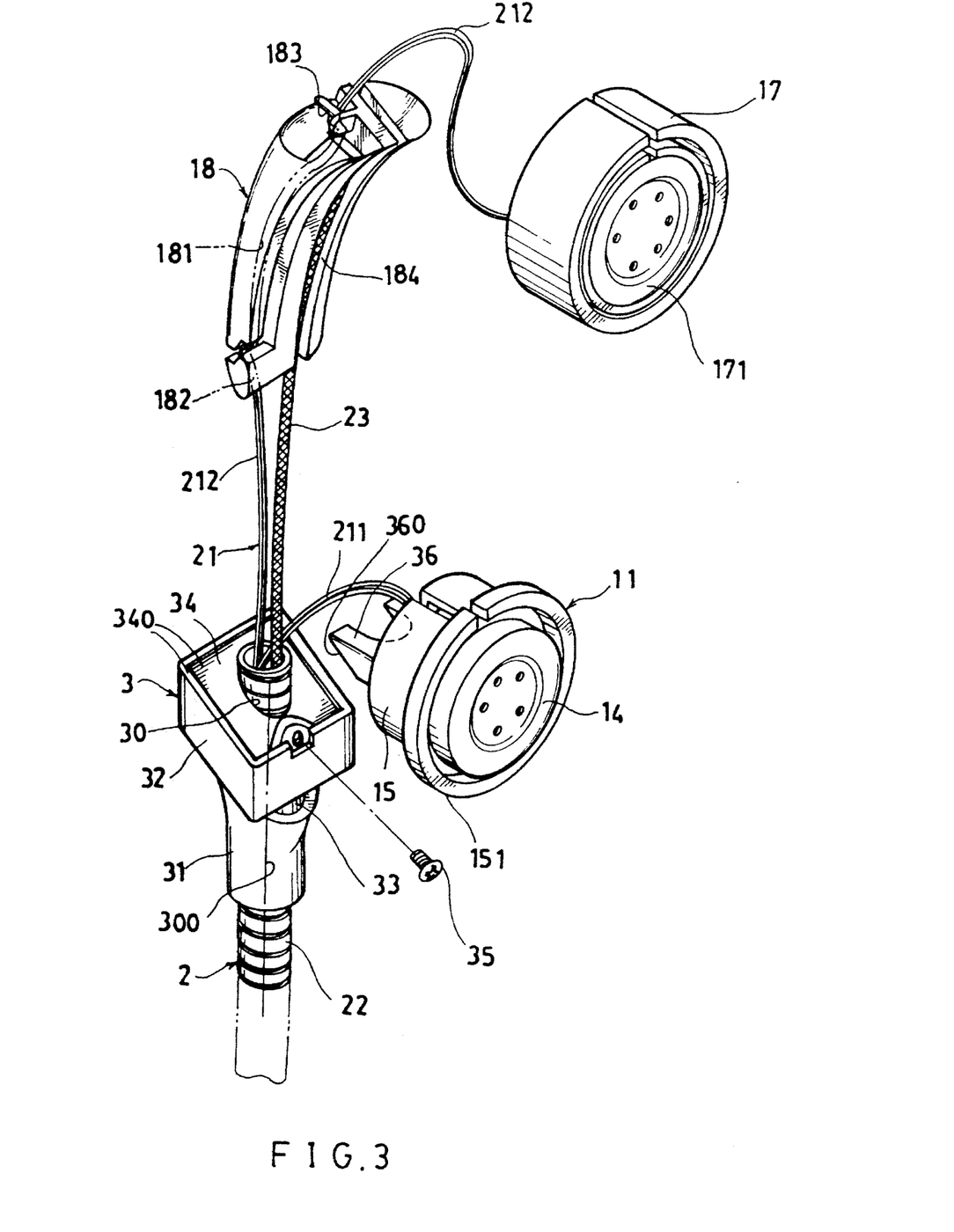
FIG. 3 is an exploded illustration showing the parts in construction of the handset of the present invention.
Figure 5:
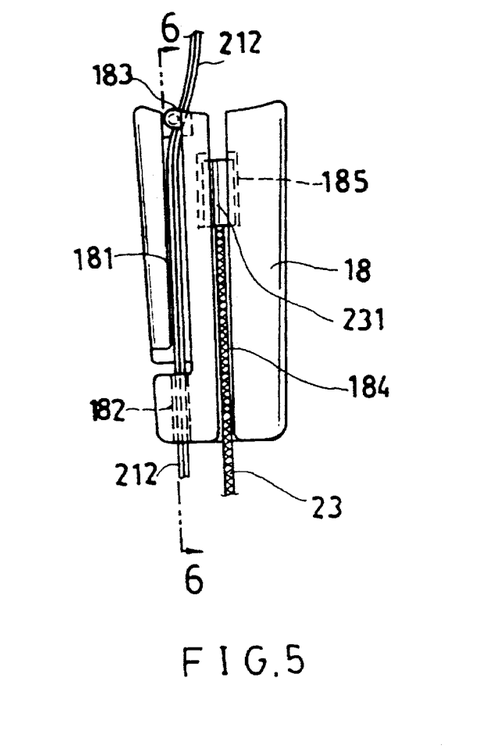
FIG. 5 is a front view of a weight core of the present invention.
Figure 6:
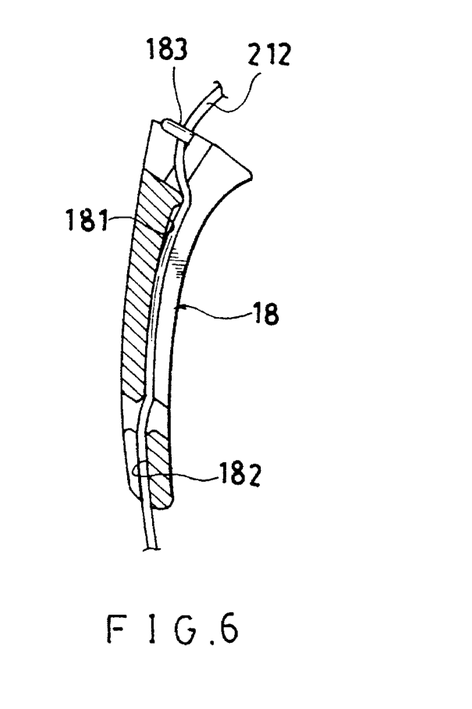
FIG. 6 is a longitudinal side sectional drawing of the weight core of the present invention when viewed from 6—6 direction of FIG. 5.

The weight core 18 as shown in FIGS. 3, 5 and 6 includes: a cord groove corrugatedly formed through a longitudinal section of the weight core 18, having a rear groove section 182 formed in a lower back portion of the core 18, a front groove section 181 longitudinally formed on a middle front portion of the core 18, and a rear upper hook portion 183 formed on an upper back portion of the core 18 thereby sinuously winding the communication cord 21 through the rear groove section 182, the front groove section 181 and the rear hook portion 183 of the core 18 to serve as a buffer for lessening any stress on the cord 2 when pulling the armored cord 2 by an external force for prolonging the service life of the cord 2 of the pay phone 5; and a steel-wire groove 184 juxtapositionally recessed in the core 18 for holding the steel wire 23 therein for fixing a handset-side end 231 of the steel wire 23 in a socket 185 recessed in another upper back portion of the core 18.

Figure 7:
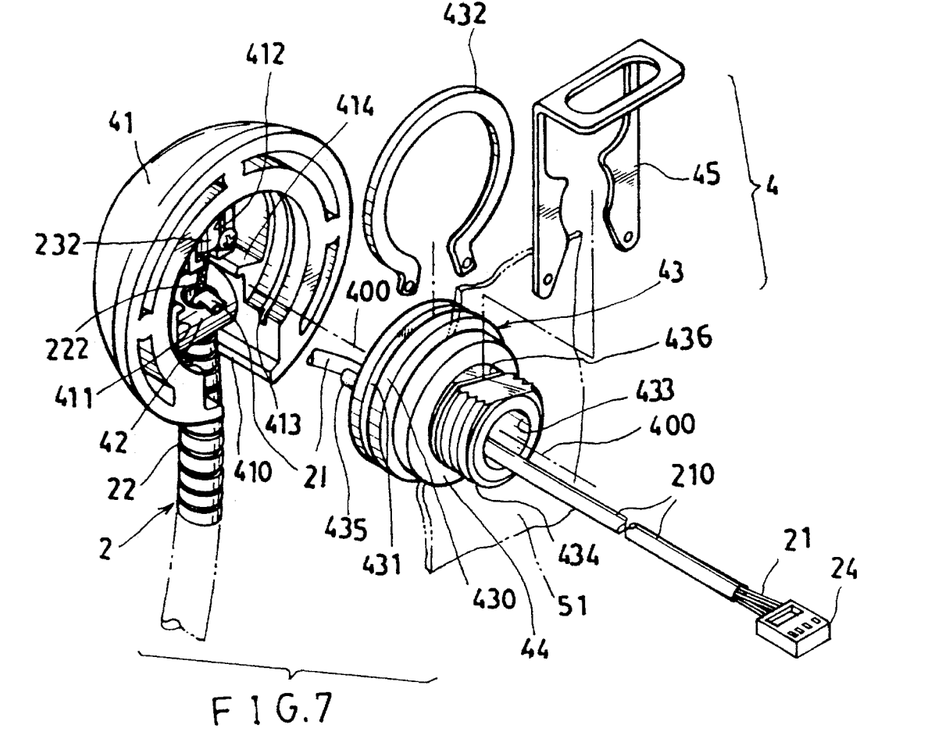
FIG. 7 is an exploded view of a universal adapter of the present invention.
Figure 8:
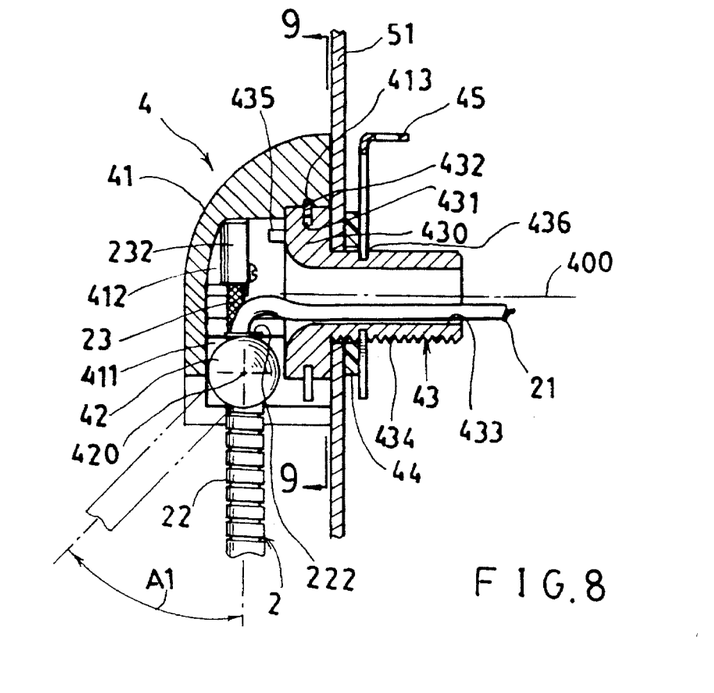
FIG. 8 is a longitudinal sectional drawing of the universal adapter of the present invention.

The universal adapter 4 includes: a rotating cap 41 having a pivoting chamber 411 recessed in a lower portion of the cap 41 for pivotally mounting a pivoting member 42 in the pivoting chamber 411, the pivoting member 42 formed with a central through hole 421 for passing and fixing an adapter end 222 of the flexible hose 22 of the armored cord 2 in the central through hole 421, a swivel member 43 having a longitudinal through hole 433 formed therethrough to communicate with the central through hole 421 of the pivoting member 42 to lead the communication cord 21 from the armored cord 2 into the pay phone 5 for connecting a telephone communication system (not shown) in the pay phone 5, with the swivel member 43 secured on a wall plate 51 of the pay phone 5 by a packing ring 44 and a U-shaped retainer 45 as shown in FIGS. 8, 7, and with the rotating cap 41 rotatably mounted on the swivel member 43, thereby allowing a swinging or rotation at a swinging angle A2 (FIG. 10) of the cap 41 and the armored cord 2 about a rotating axis 400 perpendicular to the wall plate 51 and existing at a center of the cap 41 and a center of the swivel member 43, and allowing a biasing movement at a biasing angle A1 (FIG. 8) of the cap 41 and the armored cord 2 about a biasing axis 420 projectively perpendicular to the rotating axis 400 and existing at a center of the pivoting member 42 horizontally pivotally mounted in the pivoting chamber 411 of the cap 41 in order for a universal movement of the armored cord 2 on the universal adapter 4 for a universal orientation of the cord 2 and the handset 1 for an ergonomic holding of the handset 1 when using the pay phone 5 and for a buffer for lessening any stress occurring on the adapter 4 for preventing a breaking or damage of the cord 2 for safety and security reason.

The rotating cap 41 of the universal adapter 4 includes: a wire socket 412 formed in a central portion of the cap 41 for retaining an adapter-side end 232 of the reinforcing steel wire 23 within the flexible hose 22 which passes through the pivoting member 42 and a bottom opening 410 in a bottom of the cap 41, and a rotor groove 413 circularly recessed in the cap 41 and slidably engageable with a C-shaped coupling retainer 432 retained in a stator groove 431 circularly recessed in the swivel member 43 fixed on the pay phone 5 so as for rotatably mounting the cap 41 on the swivel member 43 on the pay phone 5.

Figure 9:
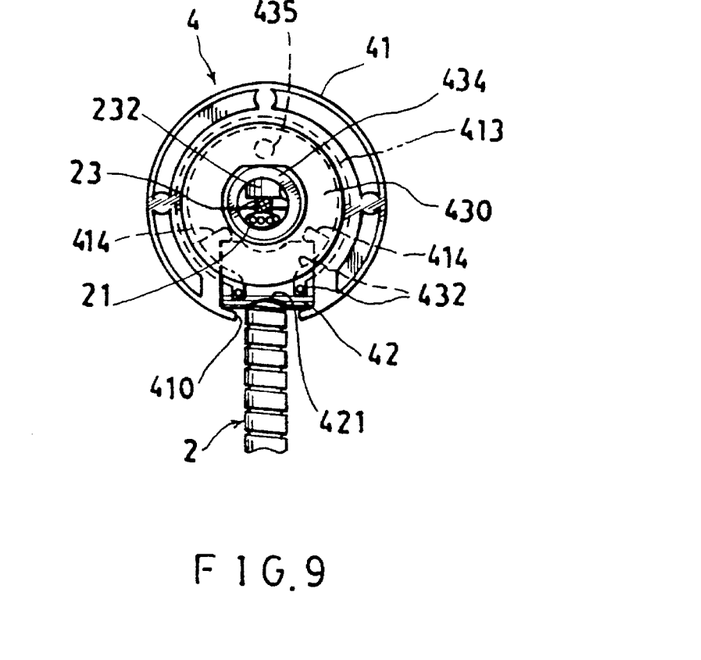
FIG. 9 is a front view illustration of the universal adapter when viewed from 9—9 direction of FIG. 8.
Figure 10:
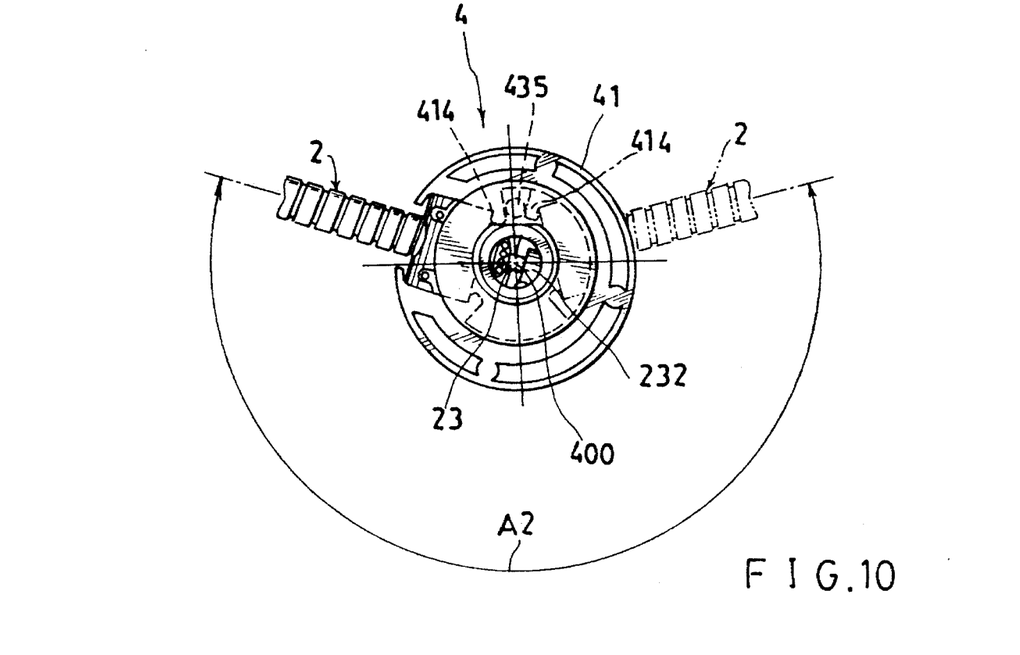
FIG. 10 shows a swinging operation of the adapter about a rotating axis in accordance with the present invention.

The swivel member 43 includes: a stator portion 430 radially enlarged from a bolt portion 434 having the C-shaped retainer 432 retained on the stator portion 430 for rotatably coupling the cap 41 on the stator portion 430, and a limiting stem 435 protruding towards the cap 41 for rotatably limiting two stoppers 414 disposed on two opposite sides of the cap 41 about the rotating axis 400, thereby providing an angular swinging movement (A2) about the rotating axis 400 as shown in FIGS. 9, 10. The swinging angle A2 as well as the biasing angle A1 are not limited in this invention.

The bolt portion 434 of the swivel member 43 is formed with a fixing retainer groove 436 for embedding the U-shaped retainer 45 in the groove 436 for fixing the swivel member 43 and the cap 41 on the wall plate 51 of the pay phone 5 by a packing ring or washer 44 for an easy assembly of the universal adapter 4 on the phone 5, without the aid of a tool. The swivel member 43 of several different specifications such as different diameters of the through hole 433 may be chosen in this invention to universally connect the cap 41.

Due to the stronger locking of the reinforcing coupler 3 (and the armored cord 2) on the handset 1 and by the universal connection of the adapter 4 (and the cord 2) with the pay phone 5, the armored cord 2 and the handset 1 can be firmly secured to the pay phone 5 for safer and longer service.

I claim:

1. A handset means for pay phone comprising:
    a handset (1) including a microphone portion (11) with a transmitter (14) formed therein and an earpiece portion (17) with a receiver (171) formed therein, an armored cord (2) remotely securing the handset (1) to a pay phone (5), a reinforcing coupler (3) secured to the microphone portion (11) of the handset (1) for fixing a first end portion of the armored cord (2) in the reinforcing coupler (3) and having a retarding member (36) retained on a transmitter bracket (15) which holds the transmitter (14) therein, said reinforcing coupler (3) retarding an inwardly protruding of the armored cord (2) into the handset for firmly securing the armored cord (2) with the handset (1), and a universal adapter (4) universally mounted on the pay phone (5) and having a second end portion of the armored cord (2) secured in the universal adapter (4) for universally linking the armored cord (2) to the pay phone (5) for ergonomically holding the handset (1) when using the pay phone (5);

said handset (1) including: said microphone portion (11) formed on a lower portion of the handset (1), the transmitter (14) held in the transmitter bracket (15) having a retaining flange (151) circumferentially formed on a circumference of the transmitter bracket (15) with the retaining flange (151) retained between transmitter seat (13) and a microphone cover (12) shielding the seat (13) and the transmitter (14) within the microphone portion (11), collar (16) defining a central opening (161) in the collar (16) integral to a lower portion of the microphone portion (111) for securing the retaining coupler (3) on the collar (16), the earpiece portion (17) formed on an upper portion of the handset (1) opposite to the microphone portion (11) with the receiver (171) held in the earpiece portion (17), and a weight core (18) embedded in an upper portion of the handset (1) adjacent to the earpiece portion (17);

said armored cord (2) including: a communication cord (21) having a transmitting wire (211) electrically connected to the transmitter (14) in the handset (1), a receiving wire loop (212) electrically connected to the receive (171) in the handset (1); a flexible hose (22) surrounding the communication cord (21) having a handset end (221) of the hose (22) secured in the reinforcing coupler (3) in the microphone portion (11) and an adaptor end (222) of the hose (22) secured in the universal adapter (4) for remotely securing the handset (1) to the pay phone (5); and a reinforcing steel wire (23) securing the handset (1) to the universal adapter (4) universally mounted on the pay phone (5) with a handset-side end (231) of the steel wire (23) secured to the weight core (18) in the handset (1) and with an adapter-side end (232) of the steel wire (23) fixed in the universal adapter (4) and said reinforcing coupler (3) including: a locking head (32) having a packing member (34) embedded in the locking head (32) for fixing a fixing screw (35) through the locking head (32) and the packing member (34) towards the handset end (221) of the flexible hose (22) of the armored cord (2) passing through a through hole (30) formed in the coupler (3) for fastening the armored cord (2) with the handset (1), a sleeve portion (31) protruding outwardly from the locking head (32) to dispose around the flexible hose (22), both sleeve portion (31) and locking head (32) being made of elastomer materials, a neck portion (33) concentrically recessed in between the locking head (32) and the sleeve portion (31) for engaging the collar (16) of the handset (1) for firmly locking the reinforcing coupler (3) with the handset (1), and a retarding member (36) integrally secured to the transmitter bracket (15) for retaining the locking head (32) of the reinforcing coupler (3) for resisting in inwardly protruding of the reinforcing coupler and the armored cord (2) fixed therein as backed by the transmitter bracket (15) which is retained in between the transmitter seat (13) and the microphone cover (12) for firmly securing the reinforcing coupler (3) and the armored cord (2) with the handset (1).

2. A handset means for pay phone according to claim 1, wherein said locking head (32) and the packing member (34) embedded in the locking head (32) define a lower inclined surface (340) on an inner surface of the locking head (32) and the packing member (34) with the lower inclined surface (340) deviating from a longitudinal axis (300) longitudinally existing at a center of the reinforcing coupler (3) with an acute angle; and the retarding member (36) formed with an upper inclined surface (360) on a bottom surface of the retarding member (36) for tangentially engaging the lower inclined surface (340) of the reinforcing coupler (3) for blocking the locking head (32) and the packing member (34) beyond the transmitter bracket (15) as backed by the transmitter bracket (15) retained in the speaker portion (11) of the handset (1).

3. A handset means according to claim 1, wherein said weight core (18) includes: a cord groove corrugatedly formed through a longitudinal section of the weight core (18), having a rear groove section (182) formed in a lower back portion of the core (18), a front groove section (181) longitudinally formed on a middle front portion of the core (18), and a rear upper hook portion (183) formed on an upper back portion of the core (18) thereby sinuously winding the communication cord (21) through the rear groove section (182), the front groove section (181) and the rear hook portion (183) of the core (18) to serve as a buffer for lessening stress on the cord (2) when pulling the armored cord (2) by an external force for prolonging the service life of the cord (2) of the pay phone (5); and a steel-wire groove (184) juxtapositionally recessed in the core (18) for holding the steel wire (23) therein for fixing a handset-side end (231) of the steel wire (23) in a socket (185) recessed in another upper back portion of the core (18).

4. A handset means according to claim 1, wherein said universal adapter (4) includes: a rotating cap (41) having a pivoting chamber (411) recessed in a lower portion of the cap (41) for pivotally mounting a pivoting member (42) in the pivoting chamber (411), the pivoting member (42) formed with a central through hole (421) for passing and fixing an adapter end (222) of the flexible hose (22) of the armored cord (2) in the central through hole (421), a swivel member (43) having a longitudinal through hole (433) formed therethrough to communicate with the central through hole (421) of the pivoting member (42) to lead the communication cord (21) from the armored cord (2) into the pay phone (5) for connecting a telephone communication system in the pay phone (5), with the swivel member (43) secured on a wall plate (51) of the pay phone (5) by a packing ring (44) and a U-shaped retainer (45), and with the rotating cap (41) rotatably mounted on the swivel member (43), thereby allowing a swinging movement at a swinging angle (A2) of the cap (41) and the armored cord (2) about a rotating axis (400) perpendicular to the wall plate (51) and existing at a center of the cap (41) and a center of the swivel member (43), and allowing a biasing movement at a biasing angle (A1) of the cap (41) and the armored cord (2) about a biasing axis (420) projectively perpendicular to the rotating axis (400) and existing at a center of the pivoting member (42) horizontally pivotally mounted in the pivoting chamber (411) of the cap (41) in order for a universal movement of the armored cord (2) on the universal adapter (4) for a universal orientation of the cord (2) and the handset (1).

5. A handset means according to claim 4, wherein said rotating cap (41) of the universal adapter (4) includes: a wire socket (412) formed in a central portion of the cap (41) for retaining an adapter-side end (232) of the reinforcing steel wire (23) within the flexible hose (22) which passes through the pivoting member (42) and a bottom opening (410) in a bottom of the cap (41), and a rotor groove (413) circularly recessed in the cap (41) and slidably engageable with a C-shaped coupling retainer (432) retained in a stator groove (431) circularly recessed in the swivel member (43) fixed on the pay phone (5) so as for rotatably mounting the cap (41) on the swivel member (43) on the pay phone (5).

6. A handset means according to claim 5, wherein said swivel member (43) includes: a stator portion (430) radially enlarged from a bolt portion (434) having the C-shaped retainer (432) retained on the stator portion (430) for rotatably mounting the cap (41) on the stator portion (430), and a limiting stem (435) protruding towards the cap (41) for rotatably limiting two stoppers (414) disposed on two opposite sides of the cap (41) about the rotating axis (400).

* * * * *